Aug. 12, 1924.
P. BERGEON
ELECTRICALLY HEATED BOILER
Filed April 4, 1921   6 Sheets-Sheet 6
1,504,928
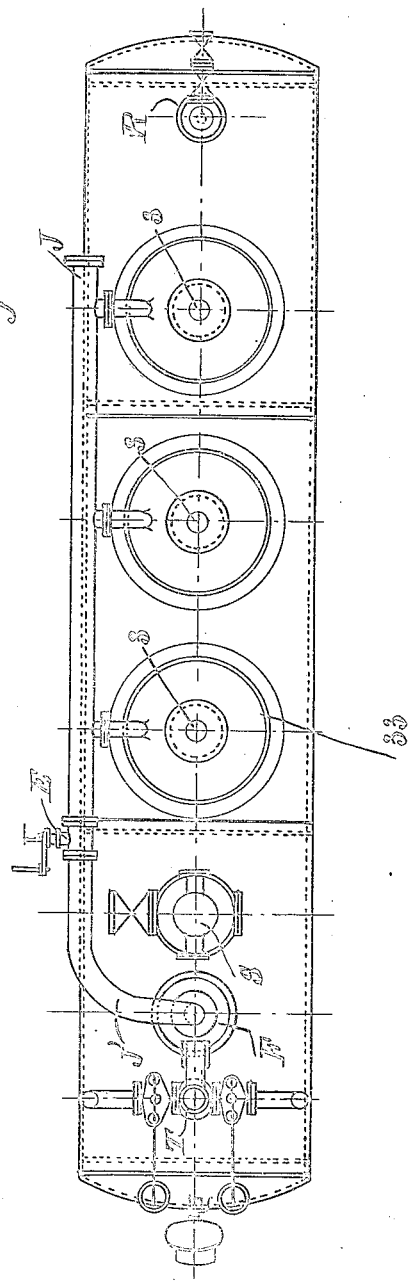
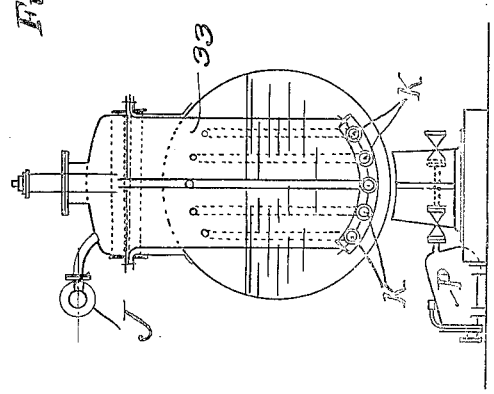
Inventor-
Paul Bergeon
By A. Singer Atty.

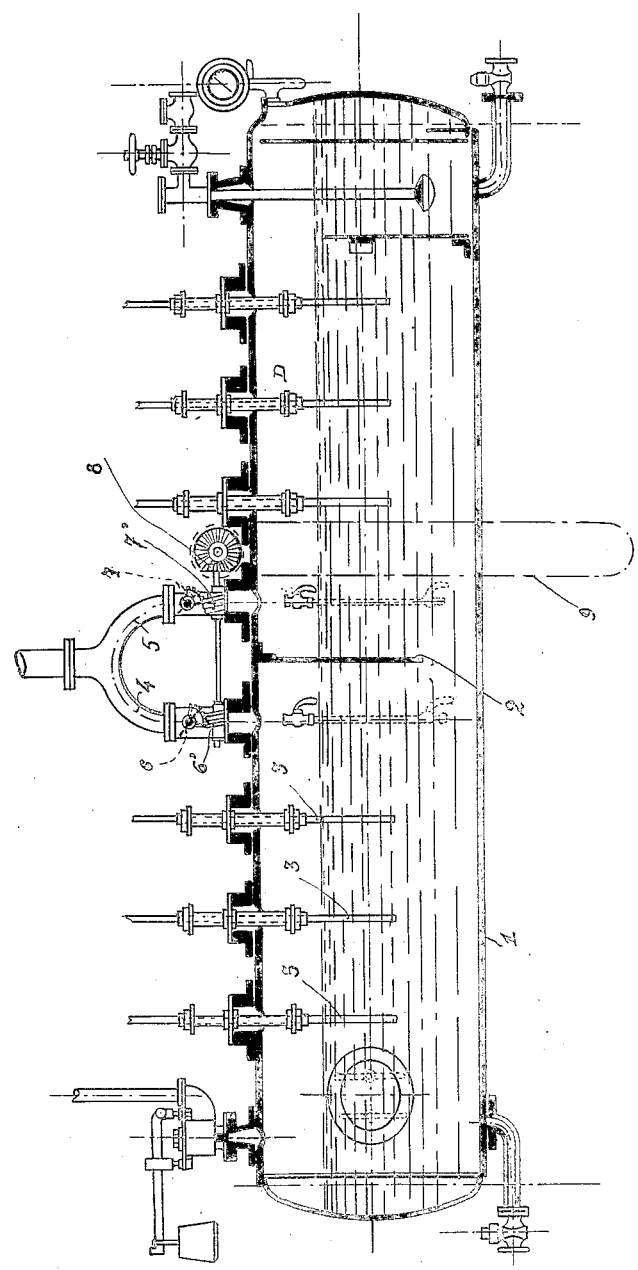

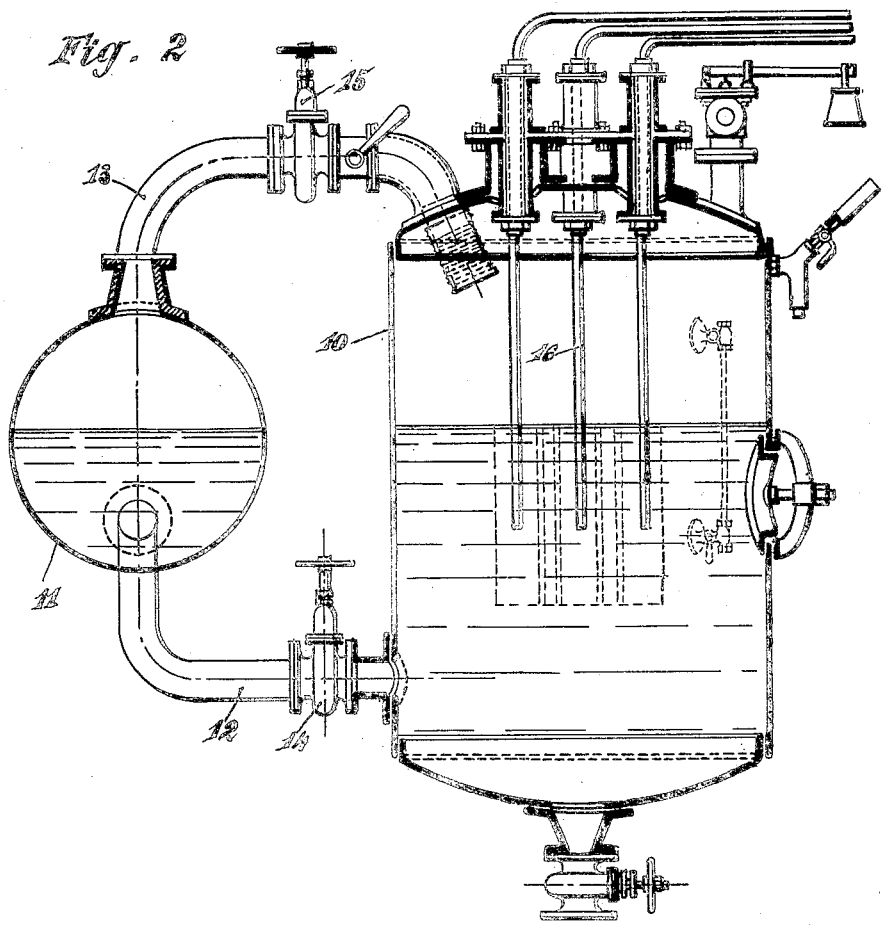

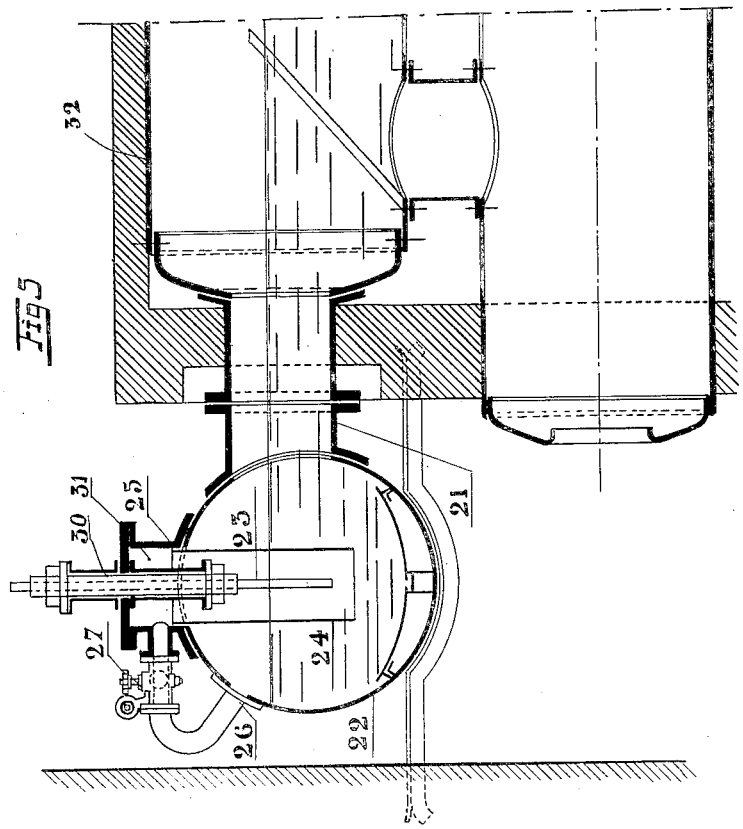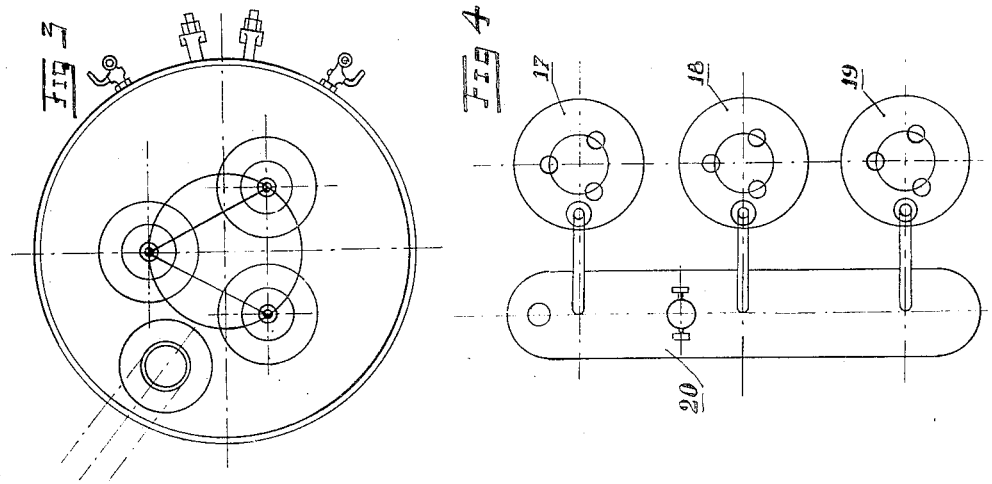

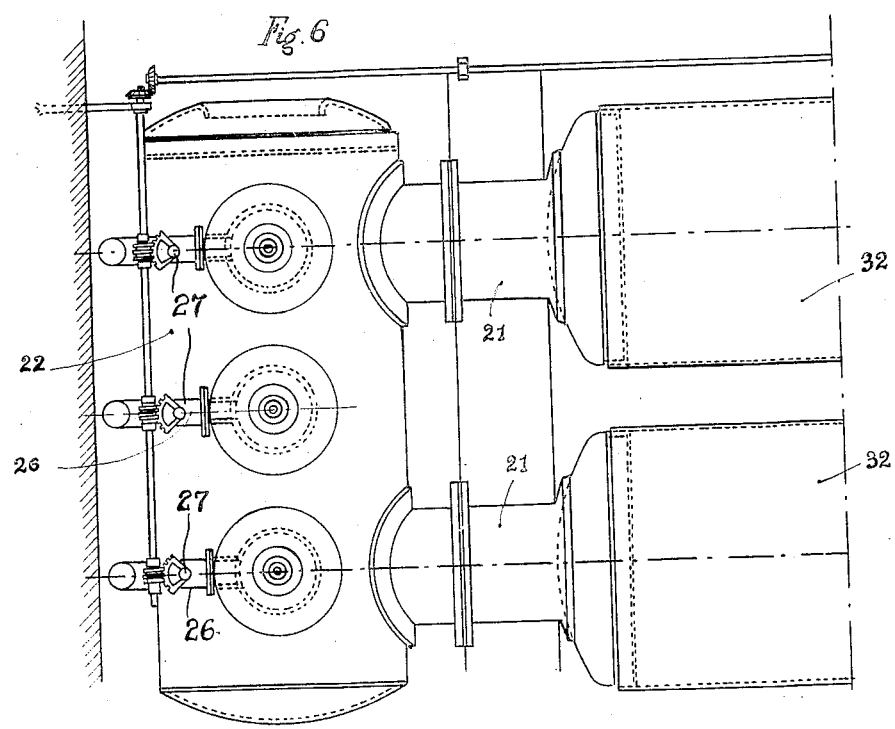

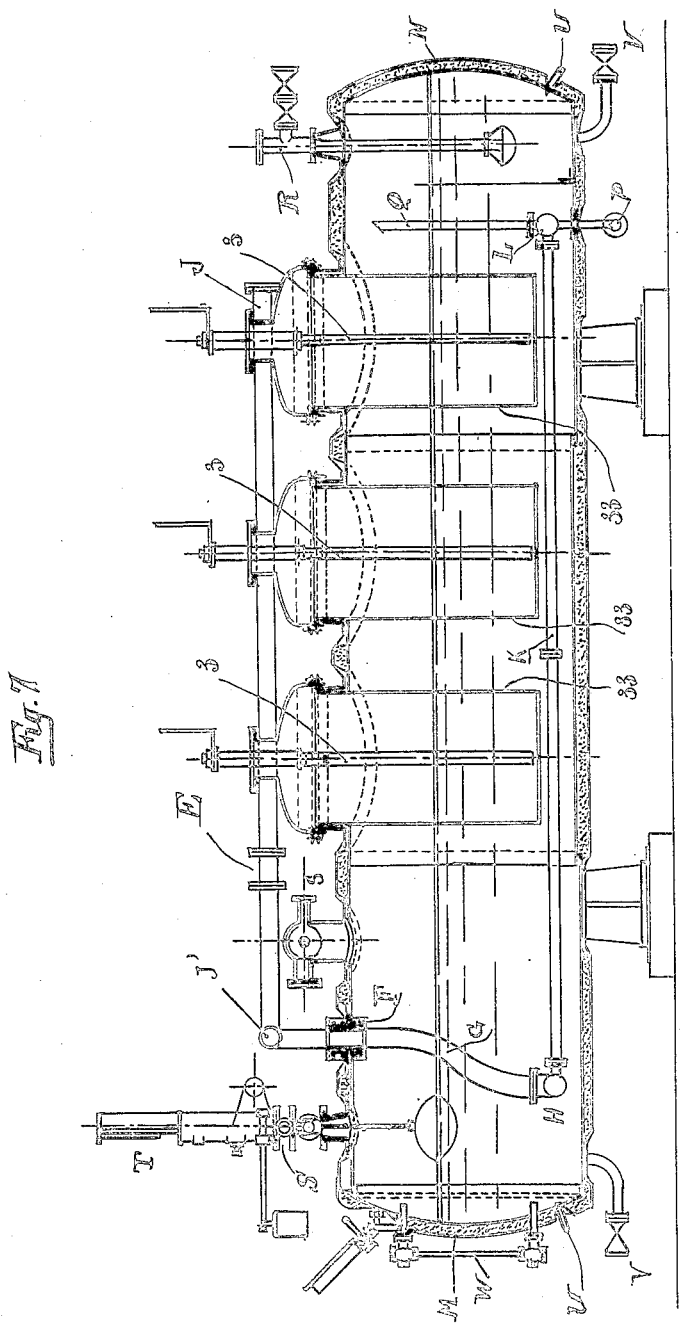

Patented Aug. 12, 1924.

1,504,928

UNITED STATES PATENT OFFICE.

PAUL BERGEON, OF GRENOBLE, FRANCE.

ELECTRICALLY-HEATED BOILER.

Application filed April 4, 1921. Serial No. 458,465.

*To all whom it may concern:*

Be it known that I, PAUL BERGEON, residing at Grenoble, Isere, France, have invented new and useful Improvements in Electrically-Heated Boilers (for which I have obtained patent in France No. 511,229, March 8, 1920, and filed application in France November 30, 1920, No. 136,875), of which the following is a specification.

This invention relates to improvements in means for electrically heating steam boilers, the object being to provide means to insure throughout the whole boiler an adjustable and substantially uniform temperature.

With the above and other objects in view, the invention consists in the construction, combination and arrangement of devices hereinafter described and claimed.

The invention can be applied to existing boilers either by the addition of a supplementary generator and connecting pipes or by the addition of a separating diaphragm in a cylindrical vessel.

In the annexed drawings:—

Fig. 1 is a vertical section of the device used to heat the upper part of a horizontal boiler, the boiler having outlet pipes provided with throttle valves.

Fig. 2 shows an application of the same invention to a vertical boiler which is connected with a collector by means of pipes provided with throttle valves.

Fig. 3 is a plan view showing the electrodes in the generator represented in Fig. 2.

Fig. 4 is a diagram showing three generators of the same type as in Fig. 1, with a single collector.

Figs. 5 and 6 are respectively, a vertical section and a plan view of a boiler of common type connected with and heated by a horizontal electrically heated generator constructed and arranged in accordance with this invention.

Fig. 7 is a longitudinal section of a boiler provided with a device for regulating the heating of the lower part of water.

Figs. 8 and 9 are respectively a cross section and a plan view of the same.

In Fig. 1 of the drawings, I show a cylindrical vessel or boiler, in the middle part of which is a depending diaphragm or partition 2 which dips in the water and below which both parts of the boiler have water communication.

In the compartments C and D thus formed, are electrodes 3 supported by insulators. The said electrodes may be fed by three-phase current or otherwise as may be desired, and are arranged in groups of three, in each of the compartments C and D.

Steam outlet tubes 4 and 5 are connected respectively with the compartments and have throttle-valves 6 and 7, respectively, which are actuated by worm gears 6' and 7', bevel gears 8 and a manually operated chain 9. This allows the use at will of either one of the compartments for the production of steam.

The extent to which the electrodes of the compartment C for instance may be caused to dip in the water is provided for as follows:—

The pipe 4 is throttled by means of the valve 6, the valve 7 remaining open and hence there is created in the compartment C an excessive pressure relatively to the compartment D, so that the water level in C is lowered and that in D raised and the extent to which the electrodes in C are immersed is moderate, and a reverse condition is secured in the compartment D, as will be understood.

In Fig. 2, I show a modification in which the boiler 10 is vertical and is connected to a collector 11 by means of the pipes 12 and 13, the one for water and the other for steam. Valves 14 and 15 are suitably mounted on the said pipes 12 and 13. In the generator 10, are seen three electrodes such as 16, for heating the water.

If it is desired to modify the immersion the pipe 13 is throttled by partially closing the valve 15, and the steam contained in the collector 11 receives an over-pressure which produces an upward movement of the level in the generator 10.

The invention can be arranged for use with several generators such as 17, 18, 19 (Fig. 4) connected with the same collector 20. These generators can be suitably connected with or disconnected from each other by means of valves located on connecting pipes provided for steam and for water, as shown.

Fig. 5 shows an arrangement applying the invention to an ordinary boiler. A large pipe 21 is provided on each boiler tank 32 so as to connect it with the generator 22 heated by electrodes 23. The electrodes 23 are arranged in a cylinder 24 which depends from the upper side of the generator, dips in the water therein and is fixed with a tight junction to the collar 25 bearing the insulator 30 which supports the electrode 23. A steam pipe 26 connects the upper part of the cylindrical chamber 31 inside the collar 25 with the upper part of the generator and is provided with a control valve 27.

Consequently if the pipe 26 is partially closed by means of the valve 27, an overpressure of steam is created in 31 and the water level therein is lowered and the extent of immersion of the electrodes is correspondingly reduced.

A plan view of the same boiler is given by Fig. 6 which shows the same generator connected with the two tanks of the boiler. This view shows also the actuating means of the valves 27.

Figs. 7, 8, and 9 show another modification in which the electrodes 3 are arranged in chambers 33 which open at their lower ends into the water in the boiler and a control valve F mounted on the collector J J' to adjust the water level M N to vary more or less the extent of the immersion of the electrodes.

These figures show also the valve R on the supply pipe, the mechanical level indicator T with alarm horns, the safety valve S, the level indicating gage W, the terminal U connected with the earth and the exhaust valves V.

The reheating device consists of tubes K in one or several rows as nearly as possible at the bottom of the boiler. These tubes are connected at their ends with collectors H and L. The collector H is connected by the pipe F G, with the steam collector J J' and the collector L has tubes Q which open in the steam space in the boiler. The valve E is provided to regulate the quantity of steam delivered to the tube F G. The pipes K are also provided with a self acting drain cock P mounted in their lowest point.

It will be understood that water supplied to the pipe F G from the collector J J' and controlled by the valve E enters the reheating tubular bundle K and passes through the tube Q into the upper part of the boiler.

This device gives the following advantages:—

(1) The quantity of condensed water in the reheating pipes K is reduced to minimum as water which could be condensed is carried away by the steam. The drain cock P operates chiefly when pressure of the boiler increases, i. e., when equilibrium of temperature takes place progressively in the whole mass of water.

(2) If owing to imperfect operation of the drain cock P the pipes K fill with water, the steam being stopped the pressure is increased in the chambers 33 surrounding the electrodes and consequently the extent of the immersion of the electrodes is diminished and their heating effect is reduced. The men in charge of the boiler are thus warned immediately if the boiler operates abnormally particularly by diminution of pressure in the manometer.

It will be understood that according to said invention the heating of the upper part of the water is adjusted by varying contacting surface of water and electrodes, while the heating of the lower part of the boiler is automatically regulated.

I claim:

1. A steam boiler having compartments arranged for water communication between them, electrodes for partial immersion in the water in the compartments, means to establish steam connection between the steam spaces of the compartments, and means to regulate the escape of steam from each compartment and thereby cause an increase of steam pressure in either of the compartments and hence effect a corresponding lowering of the water level therein and a corresponding reduction of the extent of the immersion of the electrodes of said compartment.

2. A steam boiler having compartments arranged for water communication between them, electrodes for partial immersion in the water in the compartments, means to establish steam connection between the steam spaces of the compartments, and steam conduits having valves to regulate the escape of steam from each compartment and thereby cause an increase of steam pressure in either of the compartments and hence effect a corresponding lowering of the water level therein and a corresponding reduction of the extent of the immersion of the electrodes of said compartment.

3. A steam boiler having compartments arranged for water communication between them, electrodes for partial immersion in the water in the compartments, means to establish steam connection between the steam spaces of the compartments, means to regulate the escape of steam from each compartment and thereby cause an increase of steam pressure in either of the compartments and hence effect a corresponding lowering of the water level therein and a corresponding reduction of the extent of the immersion of the electrodes of said compartment, and a tubular bundle arranged in the lower part of the boiler and having steam connection therewith.

In witness whereof I affix my signature.

PAUL BERGEON.

Witnesses:
 JULIAN DEMBLE SWEDBERG,
 LUCIENNE BOUVERET.